United States Patent [19]

Brownlee et al.

[11] Patent Number: 5,174,794
[45] Date of Patent: Dec. 29, 1992

[54] UNDERWATER STEM CUTTER

[75] Inventors: Richard W. Brownlee, Spartanburg; Carroll W. Rush, Woodruff, both of S.C.

[73] Assignee: Flo-Step, Inc., Woodruff, S.C.

[21] Appl. No.: 727,587

[22] Filed: Jul. 9, 1991

[51] Int. Cl.[5] ............................................. A01G 3/00
[52] U.S. Cl. ....................................... 47/1.01; 83/167
[58] Field of Search ...................... 47/1.01, 6; 83/167, 83/169, 631, 677

[56] References Cited

U.S. PATENT DOCUMENTS

| 4,348,832 | 9/1982 | Hauser | 47/1.01 |
| 4,486,905 | 12/1984 | Felly | 47/1.01 |
| 4,928,424 | 5/1990 | Campanelli et al. | 47/1.01 |

FOREIGN PATENT DOCUMENTS

| 0383407 | 8/1990 | European Pat. Off. | 47/1.01 |
| 2498417 | 7/1982 | France | 47/6 |
| 8601729 | 2/1988 | Netherlands | 47/1 R |

Primary Examiner—Richard E. Chilcot, Jr.
Assistant Examiner—Joanne C. Downs
Attorney, Agent, or Firm—Cort Flint; Henry S. Jaudon

[57] ABSTRACT

An underwater flower stem cutter having a U-shaped frame adapted to fit into a mobile flower container which is partially filled with water. Securing means are arranged on a wall of the frame for securing it to a wall of the container in a position in which the frame is partially submerged in the water but is slightly spaced from the floor of the container. The securing means comprise an L-shaped bracket arranged across a rear wall of the frame with thumb screws extending through the bracket to secure the U-shaped frame to the container wall. A stem locator is secured to the frame in a submerged condition and substantially parallel with the floor. The locator comprises a pair of spaced arms extending from a body portion. Said arm are laterally separated by a cutting edge. A pair of pusher rollers are respectively arranged above and below the locator and are adapted to reciprocate transversely of the spaced arms. Stems positioned in the locator are engaged by the rollers and moved into contact with the cutting edge effectuating cutting thereof.

18 Claims, 5 Drawing Sheets

UNDERWATER STEM CUTTER

BACKGROUND OF THE INVENTION

The present invention relates generally to cutting flowers and the like and specifically to an apparatus for cutting flowers underwater.

As the flowers are growing in the field or greenhouse, water moves from the root system through the "plumbing" of the plant, known as the xylem tissue. The water in the xylem tissue is in a long column and under negative pressure due to the transpirational (evaporative) pull from the leaf surfaces of the plant. As soon as a flower stem is severed from the mother plant, the water column to the root system is broken. The negative pressure in the cut stem causes air to be pulled into the stem as the water recedes. The end plates of the xylem tissue, which act as small screens at the bases of cut stems, will allow water to pass but air cannot be drawn farther into the stem. The introduction of this air pocket or embolism into the cut stem can cause post-harvest handling problems for the wholesalers and retailers of cut flowers. The harvested cut stems, with their embolisms, are packed into boxes by producers and shipped under dry conditions.

Harvested cut flowers are shipped to the United States from all over the world. During storage and shipment, flowers may be exposed to temperature extremes, low atmospheric humidity, delays in transit and lack of water, all of which can cause the flowers to desiccate, resulting in further stress on the water system of the plant. These water stressed cut flowers may not last long if they are not handled properly on receipt.

One of the best methods of restoring a functional water conducting system for cut flowers is to re-cut the stems under water as soon as they are unpacked from the shipping boxes. Research has shown that vase life for flowers re-cut under water increases from 18% to 32% depending on the species.

The practice of cutting flower stems under water was first discussed in the floriculture research of Alex Laurie at Ohio State University in 1936.

In view of these findings, an object of the invention is to provide a superior system for cutting flower stems under water.

Another object of the invention is to provide an underwater cutting apparatus which does not bruise the stems during cutting.

Another object of the invention is to provide under water flower cutting apparatus which is resistant to deterioration because of prolonged use under water.

Another object of the invention is to provide apparatus which prolongs the vase life of cut flowers.

SUMMARY OF THE INVENTION

An underwater flower stem cutter having a U-shaped frame which is adapted to be partially submerged under water. A stem locator is secured to the frame and is also in a submerged position. The locator comprises a body portion, a pair of spaced arms and a cutting edge. The frame comprises a rear wall, first and second side walls, and a support rod interconnecting said side walls. Guide means are secured to the frame and are adapted to guide stems into the locator. A pair of reciprocal pusher rolls are arranged transversely of the spaced arms. Linkage means are adapted to move the pusher rolls longitudinally of the arms into operative association with the cutting edge so that stems positioned in the locator are engaged by the rollers and pushed into contact with the cutting edge effectuating cutting.

The spaced arms are secured to the rear wall and the main body is supported by the support rod. The spaced arms are separated by the cutting edge which is V-shaped.

The guide means consist of a U-shaped plate secured within the frame and spaced from the walls. The lower edge of the plate is vertically spaced from the locator and one of the pusher rolls is arranged to reciprocate in the space between the locator and the lower edge. The linkage means is arranged for movement in the space between the U-shaped plate and the walls of the frame. The linkage includes a pair of first arms, each pivoted at one end to a side wall of said U-shaped frame. A slot is formed in a second end of the first arms. The slots are adapted to receive respective ends of the pusher rolls. The linkage includes an operating handle connected to one end of a drive rod, an ear is arranged at the opposite end of the drive rod. A first link is arranged to interconnect the operating handle with one of the first arms and a second link is arranged to interconnect the ear with the other of the first arms. Vertical reciprocation of the operating handle is translated into horizontal reciprocating movement for the pusher rolls. There are two pusher rolls vertically disposed and separated from each other by the stem locator. A pair of bearing members are secured to side walls of the U-shaped frame and are adapted to receive end portions of the pusher rolls. The bearing members are comprised of elongated self-lubricating plastic members having a longitudinal channel therein for receiving the end portions.

An underwater flower stem cutter having a U-shaped frame adapted to fit into a mobile flower container which is partially filled with water. Securing means are arranged on a wall of the frame for securing it to a wall of the container in a position in which the frame is partially submerged in the water but is slightly spaced from the floor of the container. The securing means comprise an L-shaped bracket arranged across a rear wall of the frame with thumb screws extending through the bracket to secure the U-shaped frame to the container wall.

A stem locator is secured to the frame in a submerged condition and substantially parallel with the floor. The locator comprises a pair of spaced arms extending from a body portion. Said arms are laterally separated by a cutting edge.

Stem support means are secured for vertical adjustment to a wall of the frame. The support means include a stem supporting plate arranged beneath the locator to engage the ends of the stems to control the length of stem to be cut away.

A pair of pusher rollers are respectively arranged above and below the locator and are adapted to reciprocate transversely of the spaced arms. Stems positioned in the locator are engaged by the rollers and moved into contact with the cutting edge effectuating cutting thereof.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
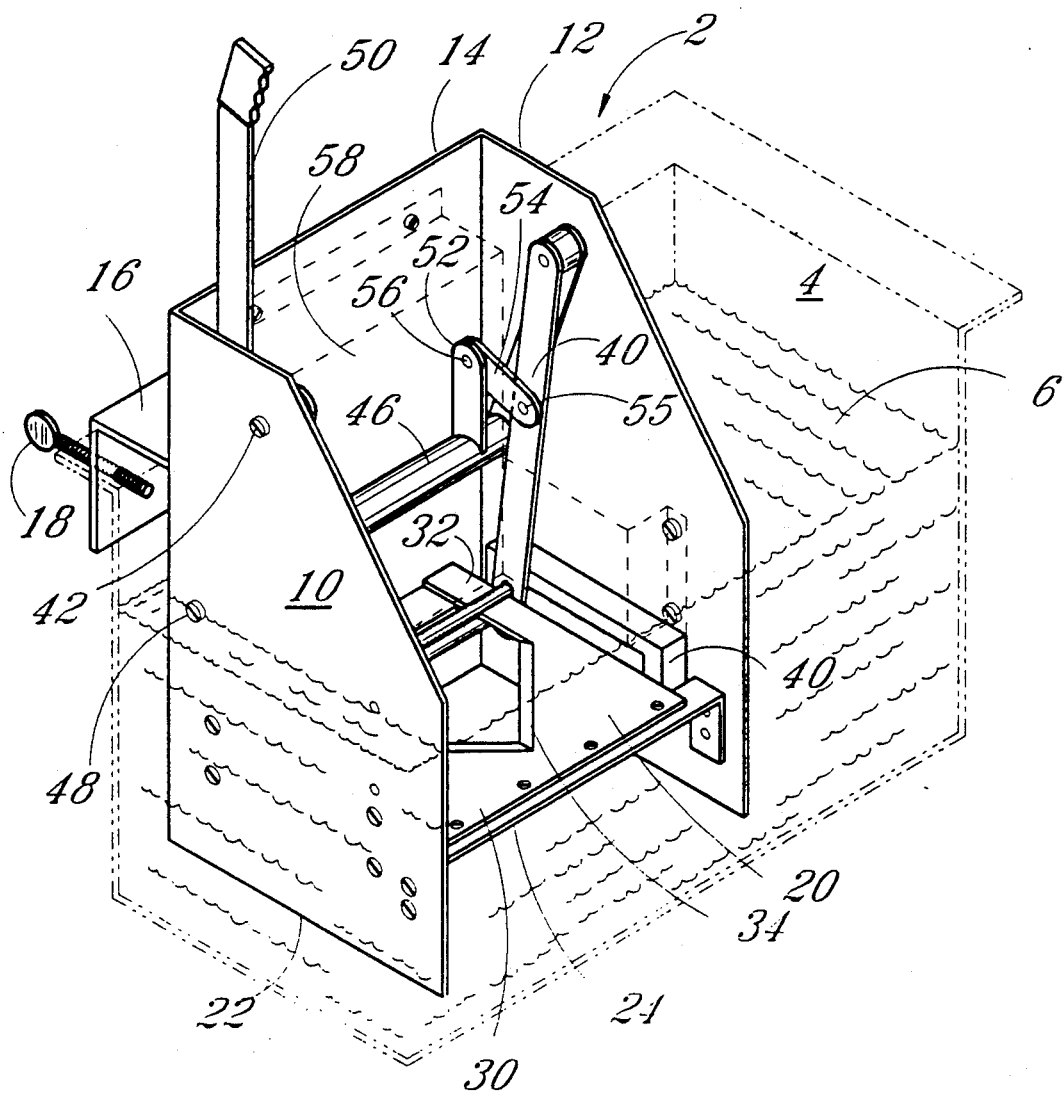
FIG. 1 is a perspective view of the cutting device of the invention in which the guide means is partially shown in phantom.
Figure 4:
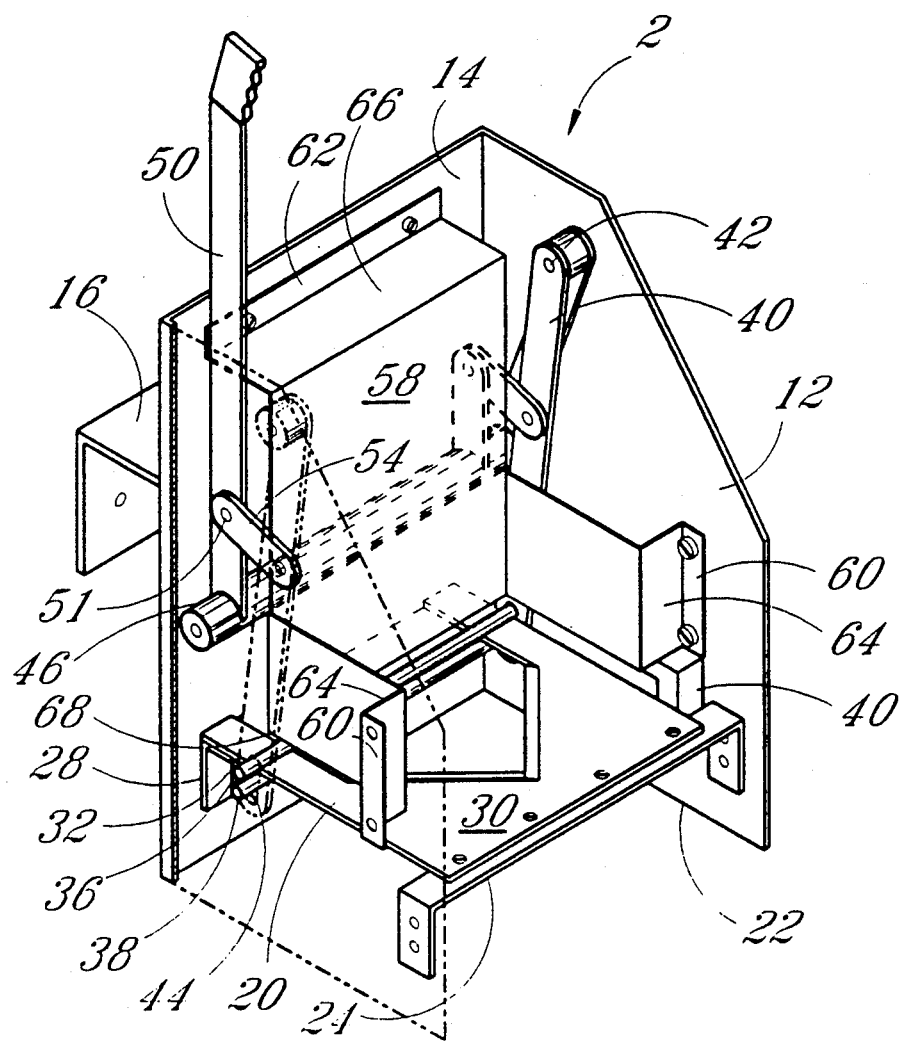
FIG. 4 is a sectional perspective view similar to FIG. 1 showing the guide means arranged with the cutter frame with a portion of the frame cut away.

Referring now to FIGS. 1 and 4, there can be seen a cutter 2 for cutting flower stems or the like arranged within container 4. The container is partially filled with water 6 so that a portion of the flower stems may remain in a submerged condition during and after cutting. Cutter 2 includes a U-shaped frame having first and second vertical side walls 10 and 12 interconnected by a rear wall 14. An L-shaped bracket 16 is arranged across and parallel to an upper edge of rear wall 14. The L-shaped bracket is provided with a plurality of thumb screws 18. In practice, cutter 2 is positioned within container 4 with L-shaped brackets 16 positioned over the top edge of a wall of the container. Thumb screws 18 are moved into firm engagement with the outside edge of the container wall as shown in FIG. 1 to securely retain the cutter in position. Preferably the cutter is held a slight distance above the floor of the container when in use. It is, however, possible for the cutter to sit firmly on the container floor when in use.

In the vicinity of the lower edge of the U-shaped frame there is provided stem locator 20. The locator is arranged perpendicular to side walls 10 and 12 and rear wall 14 and is positioned between three and five inches above lower edge 22 of the U-shaped frame. Locator 20 consists of a body portion 30 having a pair of parallel arms 32 extending from one end thereof. Arranged between arms 32 is a cutting edge 34. Locator 20 is made of stainless steel which is approximately one-sixteenth inch thick. Cutting edge 34 is preferably V-shaped and formed integral with locator 20. It has been found that by shaping the cutting edge so as to not be perpendicular to the stems being cut, results in a smoother and cleaner cutting action. It is understood, of course, that the particular size and shape of the locator may vary. A support rod 24 interconnects side walls 10 and 12 adjacent the forward edge of the U-shaped frame. Arranged at equal height across rear wall 14 is a support ledge 28.

Locator 20 is secured along a forward edge of body 30 to support rod 24. Arms 32 are secured adjacent to their ends to ledge 28 so that the locator is firmly and positively held in position relative to the U-shaped frame of cutter 2.

Figure 2:
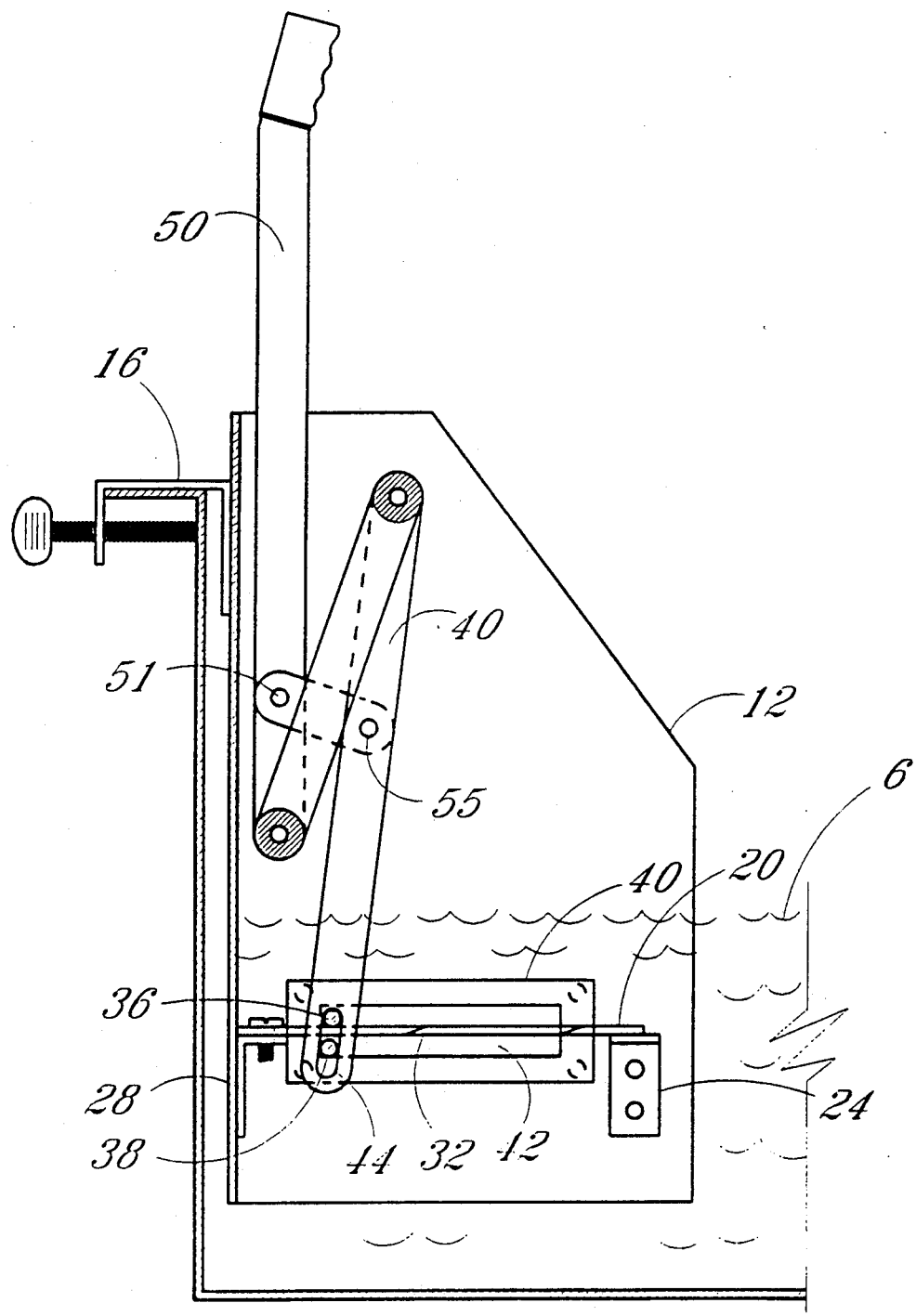
FIG. 2 is a sectional side view of the cutting device of the invention with the pusher rollers shown in the retracted position.

A pair of push rollers 36, 38 are arranged to cooperate with locator 20. Push roller 36 is positioned above locator 20 while push roller 38 is positioned below the locator. Bearing members 40 of self-lubricating plastic are secured to side walls 10 and 12 parallel with locator 20. Bearings 40 include a channel 42 identified in FIG. 2 which is adapted to receive the ends of push rollers 36, 38.

A drive linkage for push rollers 36, 38 consist of a pair of first arms 40 pivotally mounted at one end to side walls 10, 12 at 42 and are provided with slots 44 adjacent their opposite end. Slots 44 are adapted to receive opposite ends of push rollers 36 and 38 and to retain them in vertically spaced condition. The slot is of sufficient length to allow for vertical movement of push rollers 36, 38 relative to arms 40 and of sufficient width to allow rotation of the rollers during pivotal movement of the arms. Drive rod 46 is pivotally mounted at 48 in side walls 10 and 12 in a position adjacent to rear wall 14. In the vicinity of one end of drive rod 46 an operating lever 50 is secured. At the opposite end of drive rod 46 and parallel with lever 50, an ear 52 is secured. Connecting links 54 are pivotally connected to intermediate portions of arms 40 at 55, with the end of ear 52 at 56 and an intermediate portion of arm 50 at 51.

Figure 5:
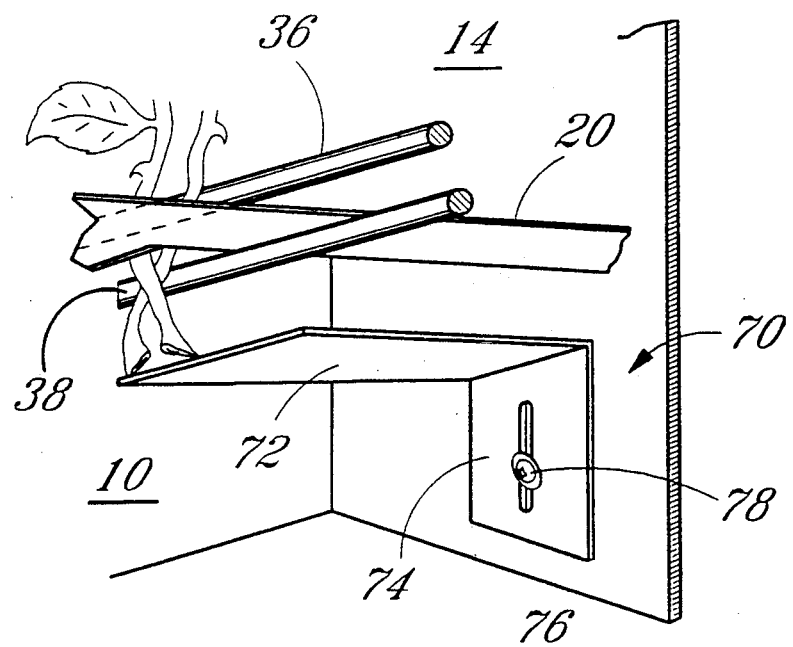
FIG. 5 is a sectional view showing an alternative arrangement which includes stem support means.

A U-shaped guide member 58 is secured at 60 and 62 to the inside of walls 10, 12, and 14. Guide member 58 has inwardly directed edges 64, 66 which act to space the guide member 58 from walls 10, 12, and 14. The linkage mechanisms 40, 46, 50, 52, and 54 are arranged in the space between guide member 58 and walls 10, 12, and 14 of cutter 2. The lower edge 68 of guide member 58 is arranged slightly above stem locator 20 so that upper push roller 36 can extend beneath guide member 58 for connection with slot 44. It may be desirable to provide a stem support member shown at 70 in FIG. 5. The stem support member 70 comprises an L-shaped plate. The upper arm 72 extends parallel with stem locator 20 and is adapted to receive the lower ends of the stems at a desired distance from the locator. The vertical arm 74 of support 70 is provided with a slot 76 through which a thumb screw extends. By adjusting the position of slot 76 relative to screw 78, the vertical position of arm 72 is adjusted.

Figure 3:
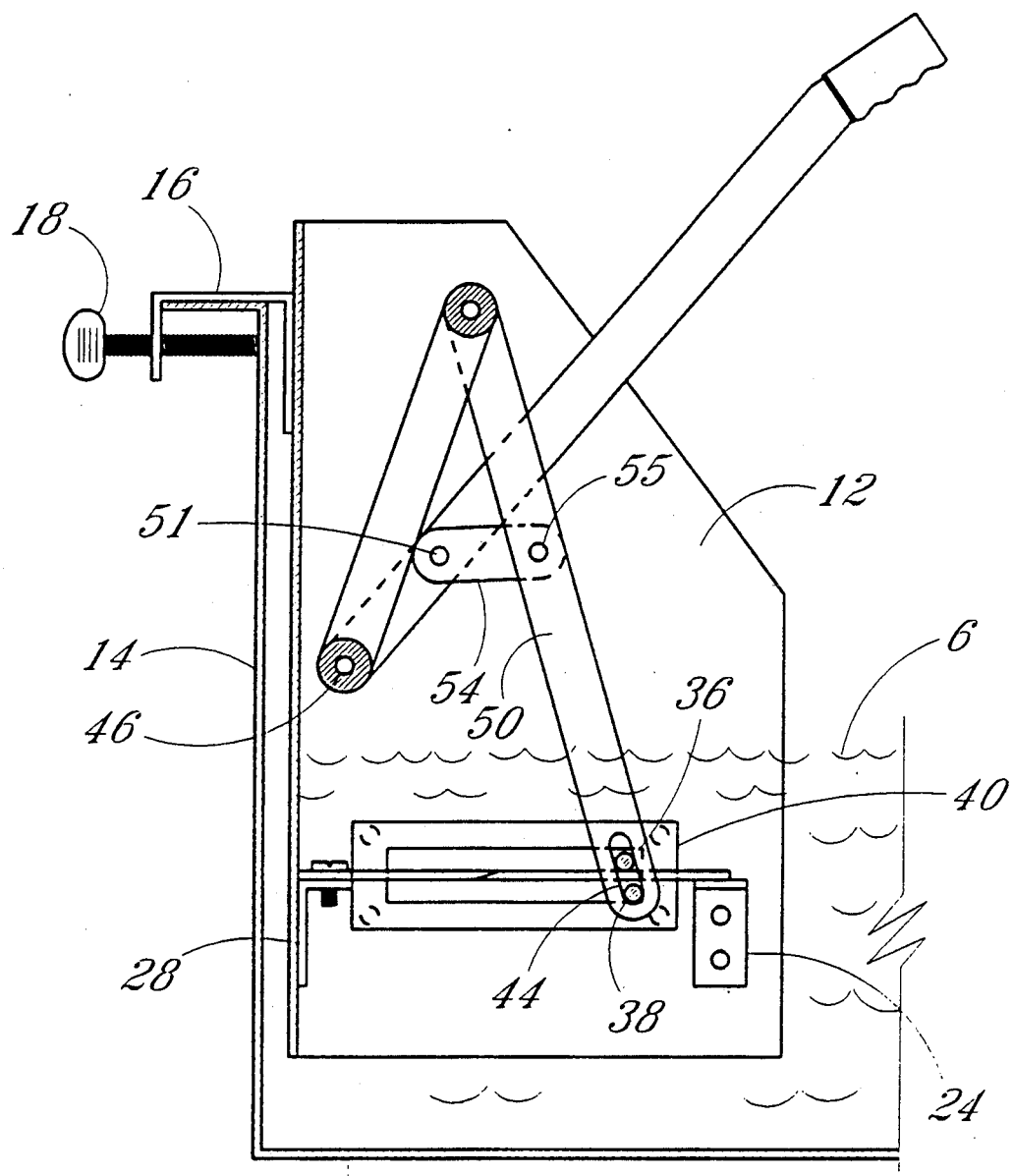
FIG. 3 is a sectional side view similar to FIG. 2 but showing the pusher rollers moved through the cutting position.

In operation, the cutting device operates in the following manner. The cutter is placed in a container approximately half filled with water. Cutter 2 is made stationary by securing member 16, 18 to a wall of the container. The lower end of cutter 2 may sit on the floor of the container or it may be elevated. The locator assembly 20 is submerged as shown in FIG. 1 and 3. Flowers A are positioned with their stems in locator 20 between arms 32, rollers 36, 38 and cutting edge 34. Lever 50 is pressed down causing the linkage mechanism to move rollers 36, 38 toward cutting edge 34. Because rollers 36, 38 are not fixedly located on arms 40 but revolve during this movement, they do not tend to crush the stems as much as an anvil-type pusher would. This rotating action, in combination with the shaped cutting edge, effectuates a clean cut in which the stems are not bruised.

Upon completion of the cutting stroke lever 50 is returned to its elevated position.

Should it be desired to cut the stems at a specific length, support member 70 is positioned in the U-shaped frame with arm 72 located at the desired position beneath locator 20.

Cutter 2 is preferably made of stainless steel to ensure that the construction is sturdy and will not be effected by corrosion. It is possible, however, that the U-shaped frame 8 and guide member 58 could be formed of plastic.

Figure 6:
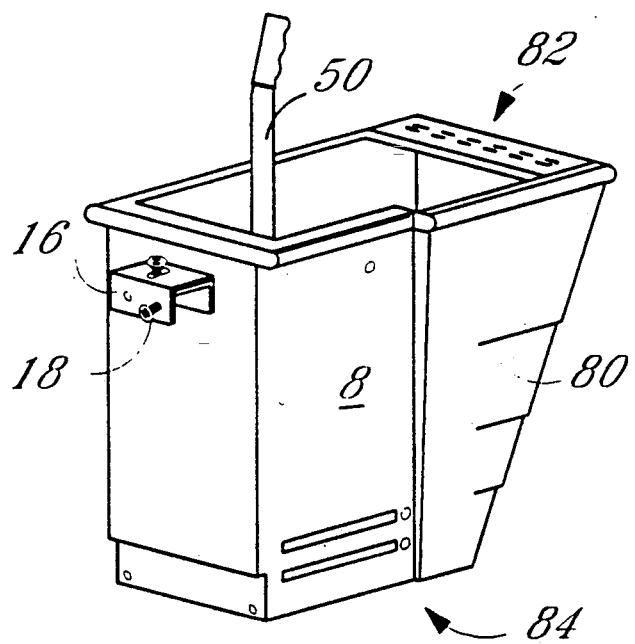
FIG. 6 is a perspective view of an alternative embodiment of the cutting assembly.

FIG. 6 shows an alternative arrangement for the device. Here cutter 82 consists of U-shaped frame 8 which is formed integral with a U-shaped container 80 to form a rectangular water containing frame. The lower portion of frame 84 is enclosed with a floor portion. The cutting mechanism within frame 8 is exactly the same as that of the embodiment shown in FIGS. 1-5.

In practice, cutter assembly 82 is secured and made stable by clamp 16, 18. Water is added so that cutting takes place with the stems submerged. The cutting operation is as previously described.

While preferred embodiments of the invention have been described using specific terms, such descriptions are for illustrative purposes only, and it is to be understood that changes and variations may be made without departing from the spirit or scope of the following claims.

What is claimed is:

1. An underwater flower stem cutter comprising:
   a U-shaped frame having an open side and an open top, said U-shaped frame being adapted to be partially submerged under water;
   a stem locator secured to said frame in a normally submerged position, said locator comprising a body portion having one edge thereof formed as a cutting edge and, a pair of spaced arms;
   reciprocal pusher rolls arranged transversely of said stem locator;
   means adapted to move said pusher rolls longitudinally of said stem locator between a position spaced from said cutting edge and a position of operative association with said cutting edge; whereby, stems may be moved through said open side and, positioned in said locator to be engaged by said rollers and pushed into contact with said cutting edge so that cutting is effectuated.

2. The cutter according to claim 1 wherein said frame comprises a rear wall, first and second side walls, and a support rod interconnecting said side walls.

3. The cutter of claim 2 wherein said spaced arms of said stem locator are secured to said rear wall and said main body of said stem locator is supported by said support rod.

4. The cutter of claim 1 wherein said spaced arms of said stem locator are separated by said cutting edge.

5. The cutter of claim 1 wherein said cutting edge is V-shaped.

6. The cutter according to claim 1 wherein guide means which comprise a U-shaped plate secured within said U-shaped frame to be spaced from said walls and said stem locator.

7. The cutter according to claim 6 wherein one of said pusher rolls is arranged to reciprocate in said space between said stem locator and said lower edge.

8. The cutter according to claim 6 wherein said linkage means is arranged for movement in said space between said U-shaped plate and said walls.

9. The cutter according to claim 1 wherein said linkage means includes a pair of first arms each pivoted at one end to a side wall of said U-shaped frame, each of said first arms having a slot formed in a second end thereof, said slots being adapted to receive respective ends of said pusher rolls.

10. The cutter of claim 9 wherein said linkage includes an operating handle connected to one end of a drive rod, an ear arranged at the opposite end of said drive rod, and a first link interconnecting said operating handle with one of said first arms and a second link interconnecting said ear with the other of said first arms; whereby,
    vertical reciprocating movement of said operating handle is translated into horizontal reciprocating movement for said pusher rolls.

11. The cutter according to claim 1 wherein there are two push roller which are vertically disposed and separated from each other by said stem locator.

12. The cutter according to claim 2 wherein bearing members are secured to said side walls of said U-shaped frame, said bearing members being adapted to receive end portions of said pusher rolls.

13. The cutter of claim 12 wherein said bearing members comprise elongated self-lubricating plastic strips having a longitudinal channel therein for receiving said end portions.

14. An underwater flower stem cutter comprising:
    a frame adapted to fit into a mobile flower container which is partially filled with water;
    securing means arranged on a wall of said frame for securing said frame to a single wall of said container in a position in which said frame is partially submerged in said water but slightly spaced from the floor of said container;
    a stem locator secured to said frame in a submerged condition substantially parallel with said floor, said locator comprising a pair of spaced arms extending from a body portion, said arms being laterally separated by a cutting edge;
    stem support means secured for vertical adjustment to a wall of said frame, said support means including a stem supporting plate arranged beneath said locator to engage ends of said stems to control the depth at which a stem may extend below said stem locator; and
    a pair of pusher rollers arranged above and below said locator and adapted to reciprocate transversely of said spaced arms; whereby,
    stems positioned in said locator may be engaged by said rollers and moved into contact with said cutting edge to effectuate cutting off a selected length thereof.

15. The cutter of claim 14 wherein said securing means comprises an L-shaped bracket arranged across a rear wall of said frame, thumb screws extending through said bracket secure said frame to said container wall.

16. The cutter of claim 14 wherein linkage means adapted to reciprocate said push roller are mounted within said frame.

17. The cutter according to claim 16 wherein said linkage means includes a pair of first arms pivotally mounted on opposite sides of said positioning means, said first arms being arranged to engage opposite ends of said push rollers whereby pivotal movement of said first arms carries said push rollers through a horizontal reciprocating stroke.

18. A cutter assembly for cutting flower stems and the like under water, said assembly comprising:
    a substantially rectangular water containing frame having first and second walls separated by first and second end portions;
    securing means arranged along an outer upper edge of said first end portion adapted to secure said assembly in a fixed position;
    cutting means arranged between said first and second side walls adjacent to said first end portion;

said cutting means comprising a stem locator secured to said first end portion and to said first and second side walls in a submerged position, said stem locator comprising a body portion, a pair of spaced arms and a cutting edge;

guide means secured to said first end and to said first and second side walls, said guide means being adapted to guide stems into said locator;

reciprocal pusher rolls arranged transversely of said spaced arms; and linkage means adapted to move said pusher rolls longitudinally of said arms into operative association with said cutting edge; whereby, stems positioned in said locator are engaged by said rollers and pushed into contact with said cutting edge so that cutting is effectuated.

* * * * *